Feb. 9, 1954
M. R. LITCHFIELD
2,668,359
CALIBRATED CALIPERS
Filed Jan. 8, 1951
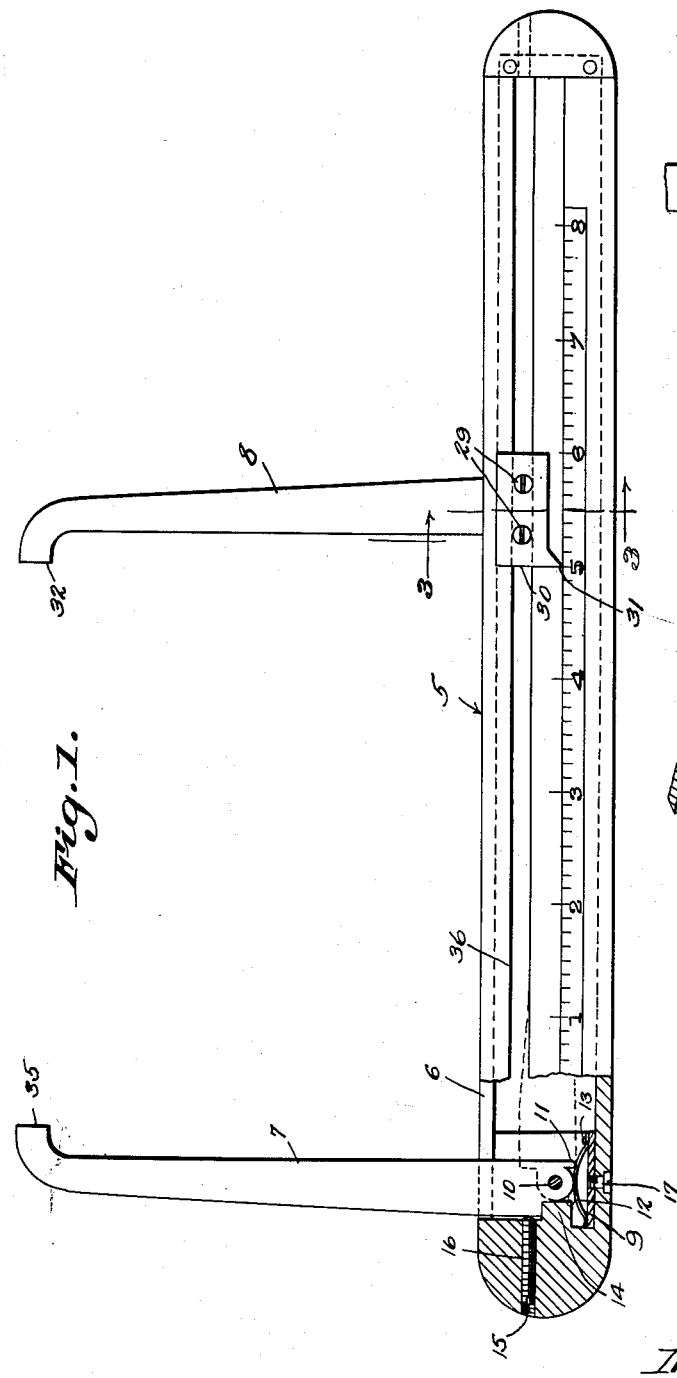
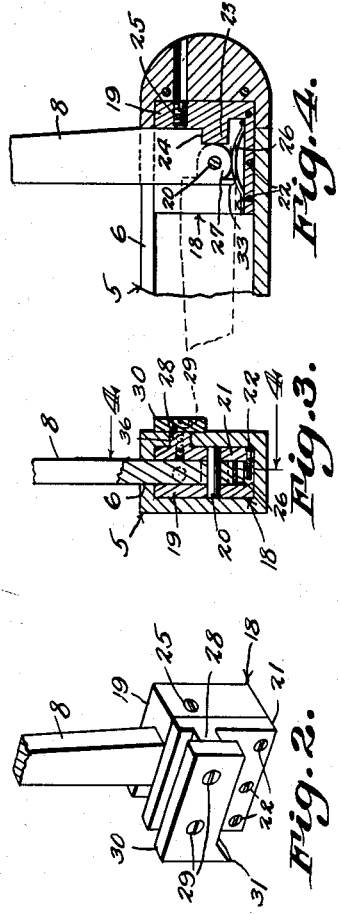
M. R. Litchfield
INVENTOR,
BY *CASnow &Co.*
ATTORNEYS.

Patented Feb. 9, 1954

2,668,359

UNITED STATES PATENT OFFICE 2,668,359

CALIBRATED CALIPERS

Mason R. Litchfield, Levelland, Tex.

Application January 8, 1951, Serial No. 204,861

1 Claim. (Cl. 33—154)

This invention relates to calibrated calipers, the primary object of the invention being to provide calipers designed for general oil field and machine shop use, wherein the calipers are placed on a round object, such as pipes, etc., the outer dimension of the round object being readily determined by observing the scale forming a part of the calipers thereby eliminating the necessity of measuring the distance between the arms of the calipers, after they have been adjusted over a round object.

An important object of the invention is to provide means whereby the arms of the calipers may be adjusted for wear, to insure accuracy.

Still another object of the invention is to provide calipers, wherein the body portion of the calipers is in the form of a housing with the arms of the calipers so arranged that they may be folded into the housing, out of the way, when the calipers are not in use.

A further object of the invention is to provide calipers including a body portion or housing having a pair of caliper arms, one of said arms being movable longitudinally of the body or housing, with means for securing the movable arm in its positions of adjustment to hold a measurement, after the measurement has been made.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing,

Figure 1 is an elevational view of calibrated calipers constructed in accordance with the invention.

Fig. 2 is a perspective view illustrating the slide or base of the removable arm.

Fig. 3 is a sectional view taken on line 3—3 of Fig. 1.

Fig. 4 is a sectional view taken on line 4—4 of Fig. 3.

Referring to the drawing in detail, the calipers include an elongated body 5 which is hollow, and provided with the slot 6 extending longitudinally of one edge thereof, through which the arms 7 and 8 of the calipers move in swinging into and out of the body portion or housing 5. Secured within the elongated body or housing 5, adjacent to one end thereof, is a plate 9 which has spaced upstanding ears between which the arm 7 is pivotally mounted by means of the pivot 10. This arm 7 is formed with a projection 11 which rests against the spring 12 and has one end thereof secured to the plate 9 at 13. Extending into the body 5 from end wall of the housing, is the lug 14 over which the lower end of arm 7 extends to hold the arm 7 against movement, beyond a predetermined point.

The threaded bore 15 is formed in one end of the body or housing, and extends inwardly from the outer surface thereof, the threaded bore accommodating the screw 16 which extends into the housing and engages the rear edge of the arm 7, restricting movement of the arm 7, the adjusting screw 16 affording means whereby the initial position of the arm 7 may be adjusted to compensate for wear. The plate 9 is held in position by means of the screw 17 which passes through an opening in one edge of the body or housing 5 and has its threaded end disposed in a threaded opening of the plate 9.

The reference character 18 indicates the slide or base for the arm 8, the arm 8 constituting the movable arm of the calipers.

As shown by Fig. 4 of the drawing, the slide or base 18 comprises a main section 19 which has its central portion cut away and in which the arm 8 is pivotally mounted, as by means of the pin 20, there being provided a movable plate 21 closing one side of the slide or base, the plate 21 being secured by means of screws 22 so that when the slide or base has been moved from the body or housing, the plate may be readily removed to service or adjust the parts of the slide or base.

As shown by Fig. 3 of the drawing, the pin 20 is disposed in an opening of the main section 19 which aligns with the pin opening of the removable plate 21. The inner wall of the slide or base of the arm 8, is formed with an inwardly extended lug 23 against which the shoulder 24 of the arm 8 engages when it is swung to its vertical position, restricting rearward movement of the arm 8. The reference character 25 indicates an adjusting screw that is disposed within a threaded opening of the slide or base 18, the inner end of the adjusting screw adapted to engage one edge of the arm 8 to restrict movement of the arm 8 in one direction and to compensate for wear in the arm or pivot to insure accurate calipers.

Secured within the bottom of the slide or base 18 is the leaf spring 26 against which the rounded end 27 of the arm 8 engages, the spring 26 acting to exert pressure upwardly on the arm 8 and insure a true operation of the arm. Extending laterally from the removable plate 21, is the rib 28 which is formed with threaded openings in the outer edge thereof, for the reception of the screws 29 that pass through the indicator plate 30 securing the indicator plate to the rib 28. One end of the indicator plate extends downwardly providing a gauge point 31, the gauge point being in a direct vertical line with the inwardly curved end 32 of the arm 8, so that when the inwardly curved end of the arm 8 is moved into engagement with a pipe or round object being measured, the exact point of contact will be indicated by the gauge point 31.

It might be further stated that the lower end of the arm 8 is formed with a lug 33 that moves over the spring 26 to normally secure the arm 8 in its extended position.

Graduations in inches and fractions of inches are provided along the side of the body portion or housing adjacent to the edge of the slot 6, for cooperation with the gauge point 31 in making a reading.

The inwardly curved end 35 of the arm 7 will be disposed in a direct line with the end of the slot 36, which is formed adjacent the end of the side of the body or housing 5, and through which the rib 28 moves in adjusting the arm 8.

Having thus described the invention, what is claimed is:

Calipers comprising a hollow elongated body having longitudinal slots formed in one edge and one side wall thereof, said body having graduations formed along the slot in the side wall, pivoted vertical swinging caliper arms mounted within the body adapted to swing through the slot in the edge of the body, supports on which said caliper arms are pivotally mounted, inwardly extended lugs formed on the supports adjacent to the pivots thereof, said caliper arms having shoulders adapted to engage said lugs as said caliper arms swing vertically limiting upward movement of said caliper arms, adjusting screws engaging the caliper arms adjusting said caliper arms with respect to the pivots thereof, one of the caliper arms being slidable longitudinally of the body, a gauge point on the slidable arm extending through the slot in said side wall and cooperating with the graduations indicating distances, and leaf springs mounted within the supports engaging said caliper arms restricting pivotal movement of said caliper arms within the supports.

MASON R. LITCHFIELD.

References Cited in the file of this patent

UNITED STATES PATENTS

| Number | Name | Date |
|---|---|---|
| 396,568 | Hellen | Jan. 22, 1889 |
| 596,818 | Moore | Jan. 4, 1898 |
| 1,238,832 | Shelby et al. | Sept. 4, 1917 |

FOREIGN PATENTS

| Number | Country | Date |
|---|---|---|
| 198,697 | Canada | Mar. 30, 1920 |